(12) United States Patent
Iwasawa et al.

(10) Patent No.: US 9,906,666 B2
(45) Date of Patent: Feb. 27, 2018

(54) INFORMATION PROCESSING APPARATUS, PRINTING SYSTEM, PRINT CONTROL METHOD, AND NON-TRANSITORY COMPUTER READABLE MEDIUM

(71) Applicant: FUJI XEROX CO., LTD., Tokyo (JP)

(72) Inventors: Masayuki Iwasawa, Yokohama (JP); Issei Matsushita, Yokohama (JP); Yutaka Ikeda, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/202,162

(22) Filed: Jul. 5, 2016

(65) Prior Publication Data

US 2017/0264763 A1    Sep. 14, 2017

(30) Foreign Application Priority Data

Mar. 10, 2016    (JP) .................................. 2016-047330

(51) Int. Cl.
| | |
|---|---|
| *H04N 1/00* | (2006.01) |
| *B41J 29/38* | (2006.01) |
| *H04N 1/32* | (2006.01) |
| *G06F 3/12* | (2006.01) |

(52) U.S. Cl.
CPC .......... *H04N 1/00641* (2013.01); *B41J 29/38* (2013.01); *G06F 3/1204* (2013.01); *G06F 3/1262* (2013.01); *G06F 3/1285* (2013.01); *H04N 1/00204* (2013.01); *H04N 1/32507* (2013.01); *G06F 3/1222* (2013.01); *H04N 2201/0039* (2013.01); *H04N 2201/0094* (2013.01)

(58) Field of Classification Search
CPC .... H04N 1/641; H04N 1/204; H04N 1/32507; H04N 2201/0039; H04N 2201/94; B41J 29/38
USPC ......................................................... 358/1.15
See application file for complete search history.

(56) References Cited

U.S. PATENT DOCUMENTS

| | | | |
|---|---|---|---|
| 5,128,762 A | 7/1992 | Muramatsu et al. | |
| 6,980,767 B1 * | 12/2005 | Cahill | ................ G03G 15/6544 399/400 |
| 2002/0159091 A1 * | 10/2002 | Sakura | .................. G06F 3/1208 358/1.15 |

(Continued)

FOREIGN PATENT DOCUMENTS

| | | |
|---|---|---|
| JP | 2009-033241 A | 2/2009 |
| JP | 2009-262493 A | 11/2009 |
| JP | 2010-072671 A | 4/2010 |

OTHER PUBLICATIONS

Aug. 4, 2017 Office Action issued in European Patent Application No. 16182143.4.

*Primary Examiner* — Jerome Grant, II
(74) *Attorney, Agent, or Firm* — Oliff PLC

(57) ABSTRACT

There is provided a print control program causing a computer to function as the following units. A setting unit performs a setting such that sorting is performed according to an output direction set for each print attribute when the sorting is performed according to a first method of sorting output materials according to the output direction among a plurality of types of sorting methods in a printing device. A generating unit generates content of a print instruction so that the output materials are output from the printing device according to the sorting method set by the setting unit.

6 Claims, 16 Drawing Sheets

(56) References Cited

U.S. PATENT DOCUMENTS

| | | | |
|---|---|---|---|
| 2005/0135854 A1* | 6/2005 | Ferlitsch | G03G 15/5087 399/403 |
| 2008/0018701 A1* | 1/2008 | Lee | B41J 2/2135 347/37 |
| 2009/0027722 A1 | 1/2009 | Tsujimoto | |
| 2009/0268244 A1 | 10/2009 | Ataka | |
| 2013/0107317 A1* | 5/2013 | Yamauchi | B41J 13/106 358/1.15 |
| 2013/0140764 A1* | 6/2013 | Samoto | B65H 85/00 271/225 |
| 2013/0341861 A1* | 12/2013 | Kanamoto | G06F 3/1291 271/288 |
| 2014/0240431 A1* | 8/2014 | Murayama | G03G 15/04054 347/118 |
| 2015/0109645 A1* | 4/2015 | Kato | G03G 15/602 358/498 |
| 2016/0102220 A1* | 4/2016 | Kido | C09D 11/40 428/195.1 |

* cited by examiner

FIG. 3

311 OUTPUT INFORMATION

| PRINT JOB | SORTING METHOD | UNIT OF SORTING | ATTRIBUTE |
|---|---|---|---|
| JOB 1 | NO SORTING | | |
| JOB 2 | JOB SEPARATION | JOB UNIT | |
| JOB 3 | JOB SEPARATION | ATTRIBUTE UNIT | AUTHENTICATED USER NAME |
| JOB 4 | OFFSETTING AND DISCHARGING | JOB UNIT | |

3110  3111  3112  3113

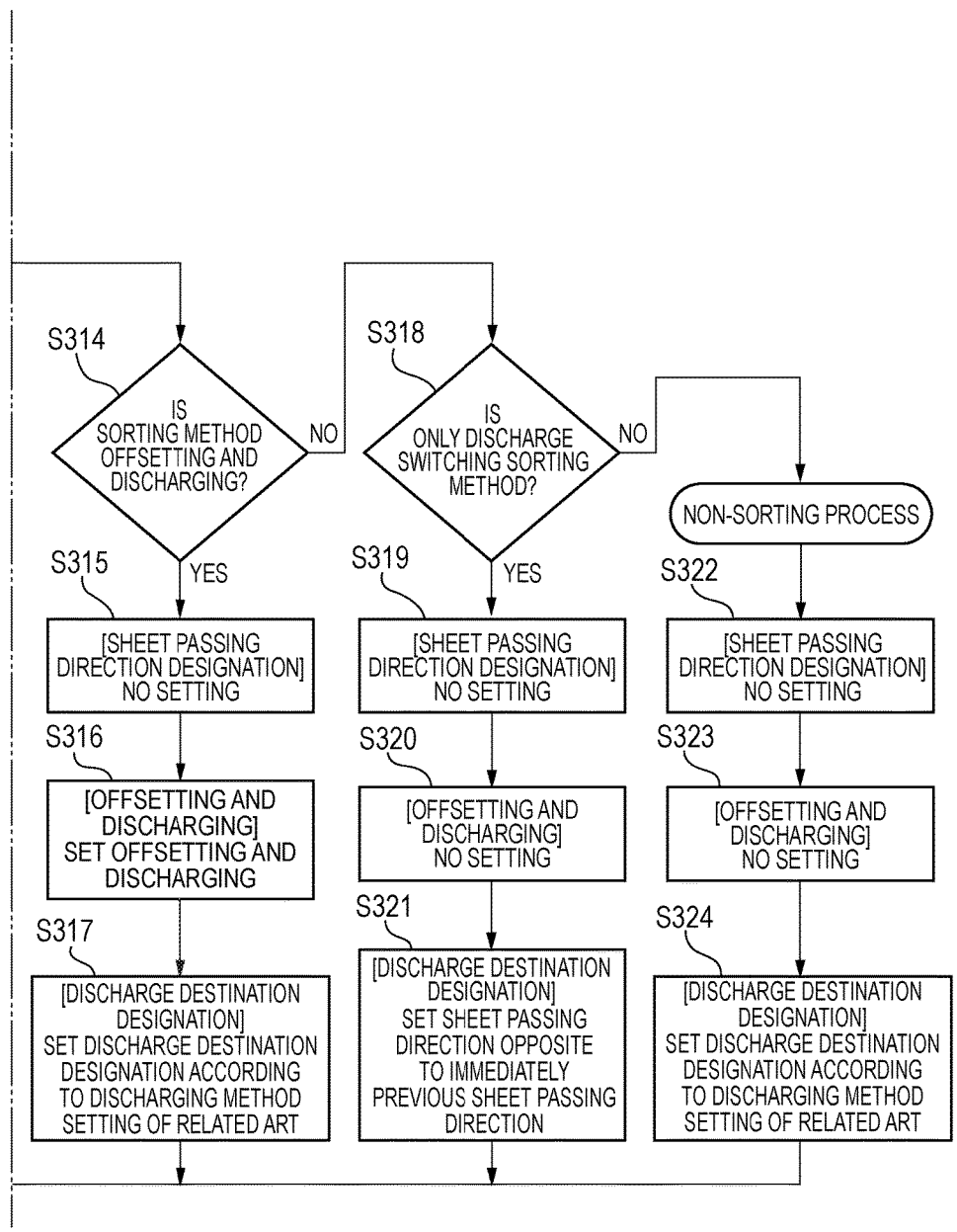

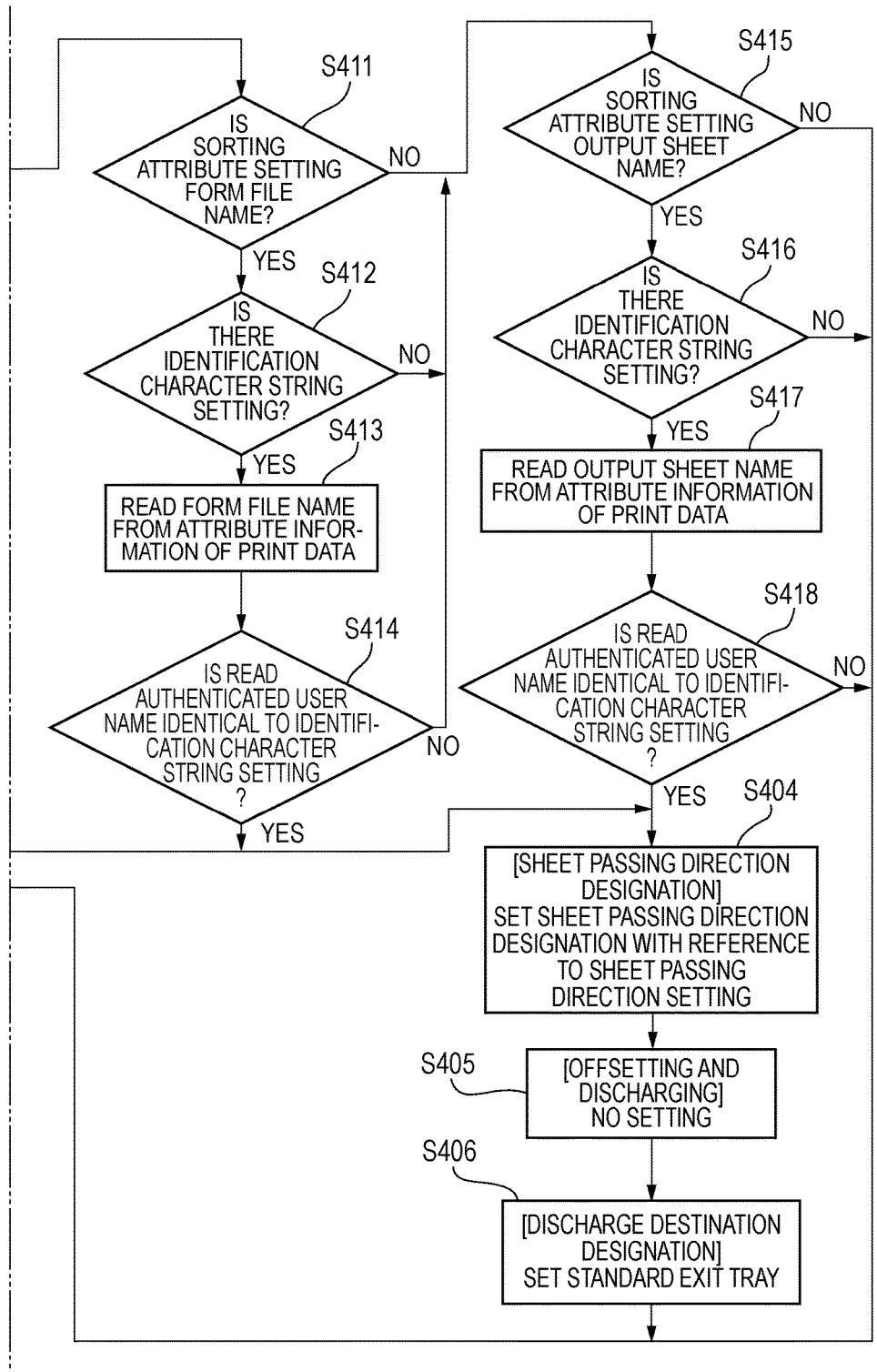

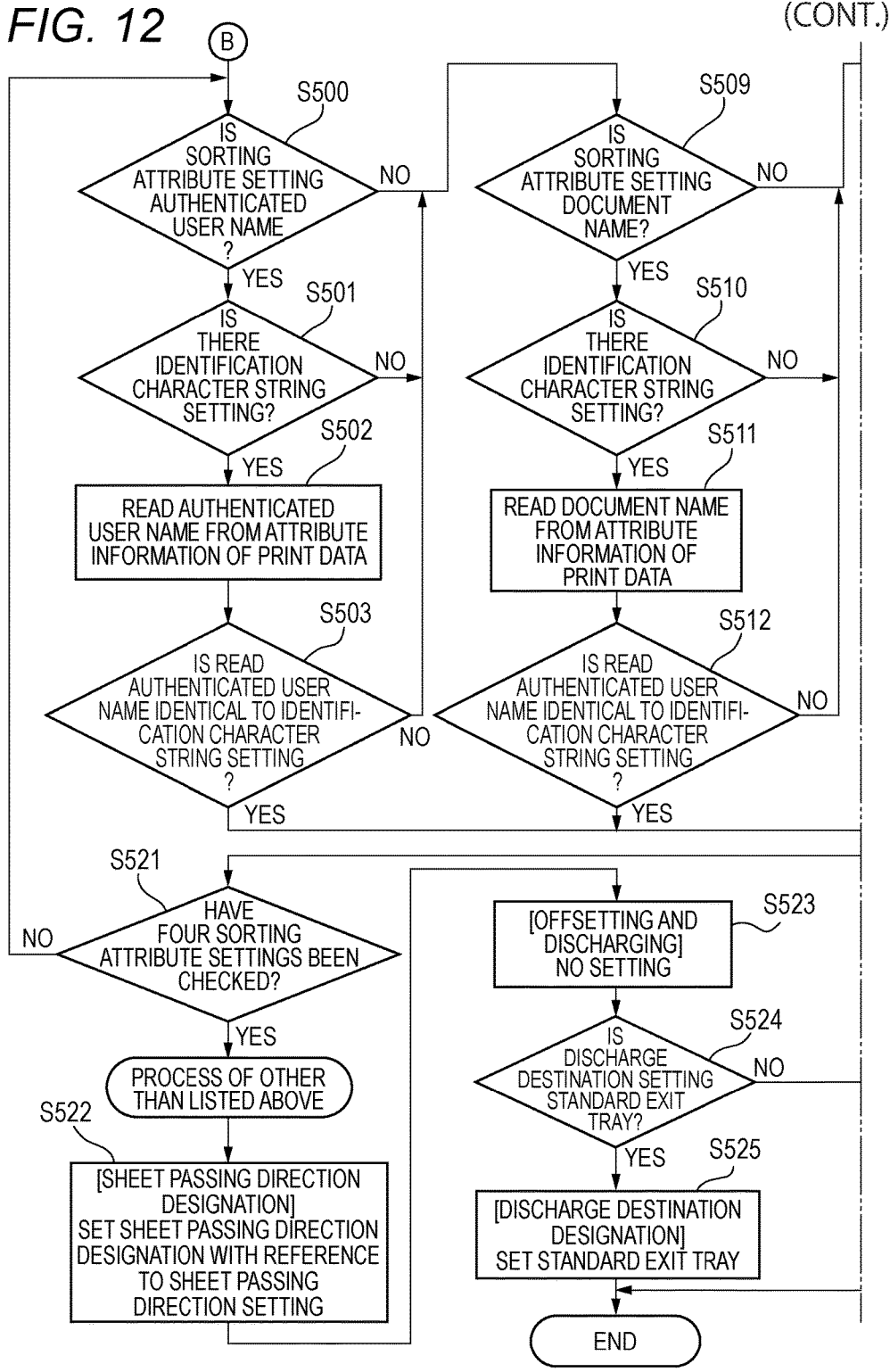

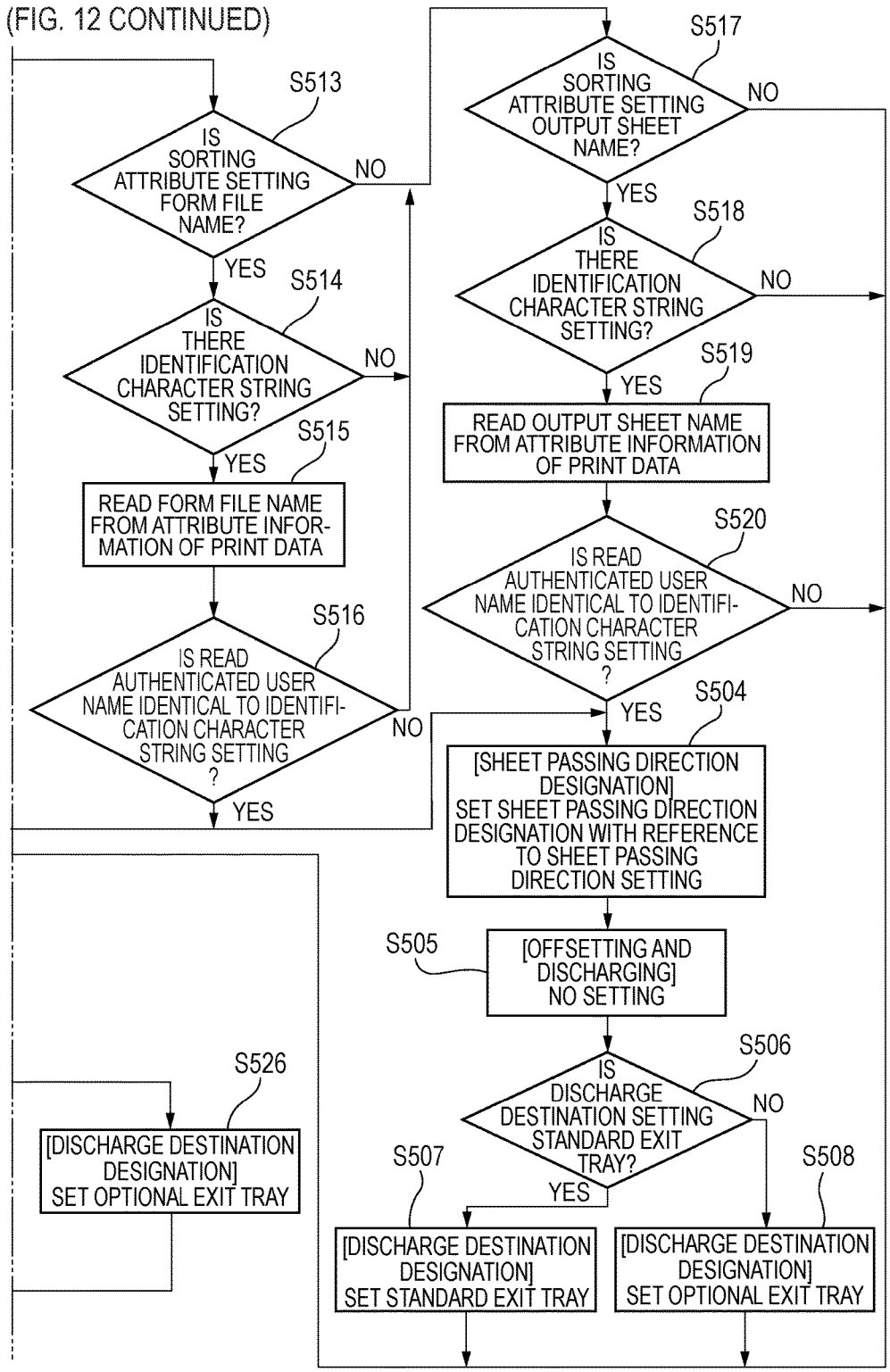

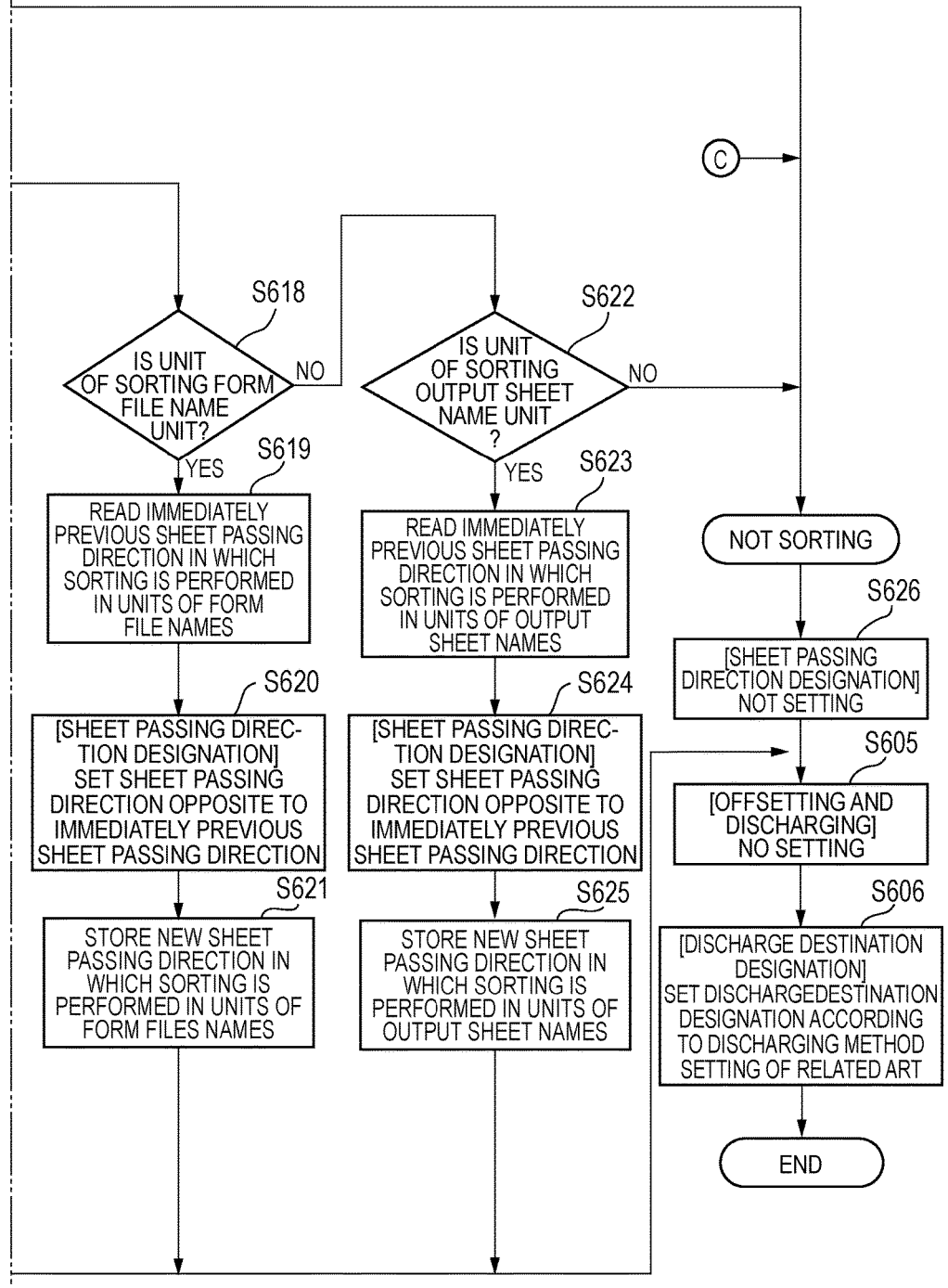

INFORMATION PROCESSING APPARATUS, PRINTING SYSTEM, PRINT CONTROL METHOD, AND NON-TRANSITORY COMPUTER READABLE MEDIUM

CROSS-REFERENCE TO RELATED APPLICATIONS

This application is based on and claims priority under 35 U.S.C. § 119 from Japanese Patent Application No. 2016-047330 filed on Mar. 10, 2016.

TECHNICAL FIELD

The present invention relates to an information processing apparatus, a printing system, a print control method, and a non-transitory computer readable medium.

RELATED ART

For example, in offices, often, a plurality of terminals (personal computers (PCs)) are connected with one printing device (printer) via a network such as a local area network (LAN), and one printing device is shared by a plurality of users. At this time, since recording sheets related to print jobs of a plurality of users are output to one printing device, the printing device sorts and outputs the recording sheets so that a person who prints it and what a print job is are identified.

SUMMARY

According to an aspect of the embodiments of the present invention, there is provided an information processing apparatus comprising: a setting unit that performs a setting such that sorting is performed according to an output direction set for each print attribute when the sorting is performed according to a first method of sorting output materials according to the output direction among a plurality of types of sorting methods in a printing device; and a generating unit that generates content of a print instruction so that the output materials are output from the printing device according to the sorting method set by the setting unit.

BRIEF DESCRIPTION OF THE DRAWINGS

Exemplary embodiments of the present invention will be described in detailed based on the following figures, wherein:

FIG. 3 is a diagram illustrating exemplary output information;

FIG. 12 is a flowchart illustrating a sorting process based on a standard exit tray and an optional exit tray, job separation, and an attribute unit;

DETAILED DESCRIPTION

Figure 1:
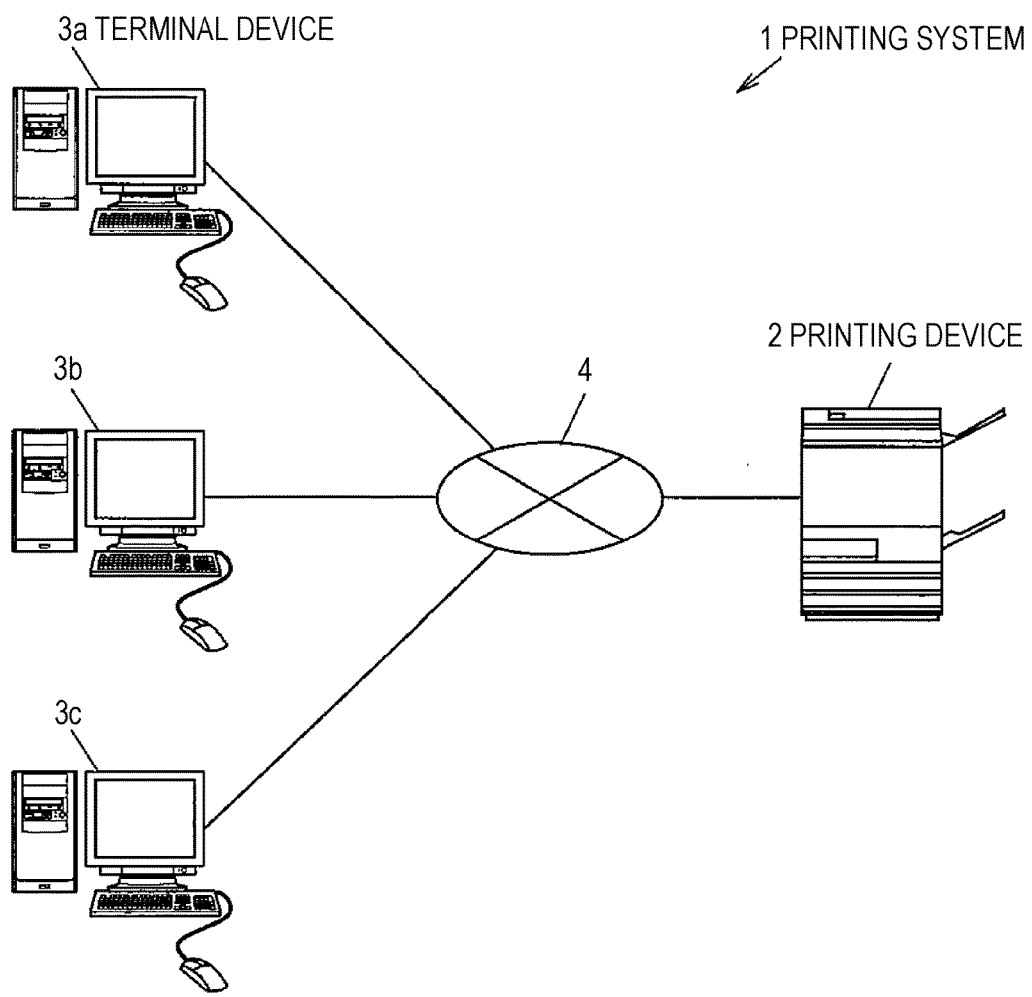
FIG. 1 is a schematic diagram illustrating an exemplary configuration of a printing system according to an exemplary embodiment.

[First Exemplary Embodiment]
(Configuration of Printing System)
FIG. 1 is a schematic diagram illustrating an exemplary configuration of a printing system according to an exemplary embodiment.

As an exemplary embodiment, a printing system 1 is configured such that a plurality of terminal devices 3a, 3b, and 3c are connected to a printing device (printer) 2 via a network 4. In the example illustrated in FIG. 1, the three terminal devices 3a, 3b, and 3c are connected to the printing device 2, but the number of terminal devices connected to the printing device 2 is not limited to three.

The network 4 is a communication network such as a local area network (LAN) or the Internet in which transmission and reception of data are performed through wired communication (an electric cable, an optical cable, or the like), wireless communication (a radio wave, infrared light, or the like), and the like.

(Printing Device)
The printing device 2 has a printing function of executing printing based on information received from the terminal devices 3a, 3b, and 3c and outputting a printed material. The printing device 2 may be a so-called multifunction device having a scanner function of optically scanning a sheet plane or the like, a facsimile function, and the like in addition to the printing function. The printing device 2 includes a plurality of sheet trays (sheet feeding openings) so that printed recording sheets are sorted and output, and a plurality of recording sheets having different sizes are mounted in different sheet feeding directions.

(Terminal Device)
Each of the terminal devices 3a, 3b, and 3c is an information processing apparatus capable of generating information related to a print job serving as a print designation of the user and managing an operation of the printing device 2. A detailed configuration of each of the terminal devices 3a, 3b, and 3c will be described later, and each of the terminal devices 3a, 3b, and 3c includes a communication unit that communicates with the network 4, an operating unit such as a touch pad for an operation input, a display unit such as a liquid crystal display (LCD), a control unit such as a central processing unit (CPU), and a storage unit such as a flash memory. Examples of each of the terminal devices 3a, 3b, and 3c include a PC, a personal digital assistant (PDA), and a mobile phone.

Hereinafter, the terminal devices 3a, 3b, and 3c are also referred to collectively as a "terminal device 3." Next, a configuration of the terminal device 3 serving as the information processing apparatus will be described.

(Configuration of Terminal Device Serving as Information Processing Apparatus)

Figure 2:
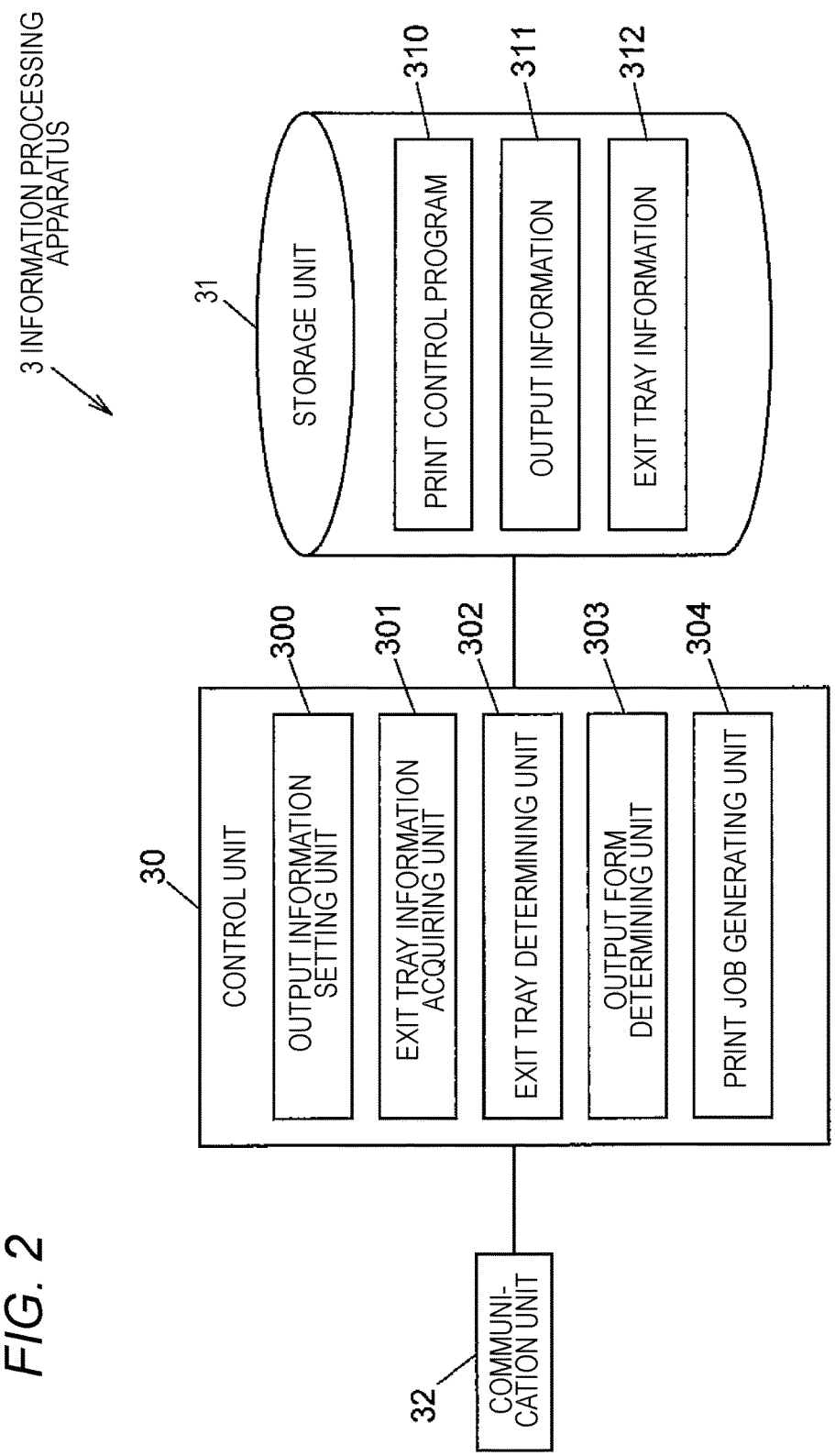
FIG. 2 is a block diagram illustrating an exemplary configuration of a terminal device according to an exemplary embodiment.

FIG. 2 is a block diagram illustrating an exemplary configuration of the terminal device 3 serving as the information processing apparatus according to an exemplary embodiment.

The terminal device (information processing apparatus) 3 includes a control unit 30 that is configured with a CPU or the like, controls the respective units, and executes various kinds of programs, a storage unit 31 that is configured with a recording medium such as a hard disk drive (HDD) or a flash memory and serves as a storage device storing information, and a communication unit 32 that communicates with the outside via the network 4.

The control unit 30 functions as an output information setting unit (setting unit) 300, an exit tray information acquiring unit 301, an exit tray determining unit 302, an output form determining unit 303, a print job generating unit (changing unit) 304, and the like by executing a print control program 310 which will be described later.

The output information setting unit 300 sets output information 311 by setting attribute information including a print attribute and an output form indicating a sorting method and an unit of sorting to a print job serving as the print designation of the user. Since the print attribute can be an unit of sorting, examples of the print attribute include an authenticated user name, a document name, a form file name, and an output sheet name (a recording sheet name). The authenticated user name is used to identify each user when one terminal is used by a plurality of users. FIG. 3 illustrates an example of the output information 311. As illustrated in FIG. 3, the output information 311 is configured such that a sorting method 3111, an unit of sorting 3112, and an attribute 3113 when the unit of sorting is an attribute are associated with each print job 3110.

Examples of the sorting method includes a first method in which sorting is performed based on job separation, and then outputting is performed, a second method in which sorting is performed based on offsetting and discharging, and then outputting is performed, and a method in which sorting is performed based on discharge destination switching, and then outputting is performed. The sorting based on the job separation is one in which output materials are sorted according to an output direction so that switching between sheet feeding in the longitudinal direction and sheet feeding in the traverse direction is performed for each print job, and then a recording sheet is output. The sorting based on the offsetting and discharging is one in which sorting is performed by shifting discharge positions of recording sheets from side to side for each unit of sorting such as a print job and then discharging the recording sheets. The sorting based on the discharge destination switching is one in which, when the printing device is equipped with a plurality of exit trays, sorting is performed by outputting a recording sheet to a different exit tray according to a print job.

When the sorting is performed through the job separation, either of a job unit and an attribute unit is selected as the unit of sorting. When the attribute unit is selected, an attribute used for the sorting among the attribute information is set. Even when the sorting is performed based on the offsetting and discharging, either of the job unit and the attribute unit may be selected as the unit of sorting.

The exit tray information acquiring unit 301 acquires a configuration of an exit tray set to the printing device 2. The exit tray information acquiring unit 301 performs two-way communication with the printing device 2, monitors a state of the printing device 2, and transmits print data generated as data that is processable by the printing device 2 to the printing device 2. For example, the exit tray information acquiring unit 301 transmits an inquiry to the printing device 2 at predetermined time intervals, and acquires operation information and exit tray information of the printing device 2. The exit tray information acquired by the exit tray information acquiring unit 301 is stored in the storage unit 31 as exit tray information 312.

The exit tray determining unit 302 determines whether a configuration of the exit tray of the printing device 2 acquired by the exit tray information acquiring unit 301 includes only a normal standard exit tray serving as a first exit tray or includes an optional exit tray serving as a second exit tray installed in addition to the standard exit tray as well. In the printing device 2 according to the exemplary embodiment, an offset catch tray having an offsetting and discharging function is mounted only in the optional exit tray, and thus when only the standard exit tray is mounted in the printing device 2, it is difficult to set the sorting method by the offsetting and discharging.

The output form determining unit 303 determines the output form based on the output information 311 of the print job set by the output information setting unit 300 according to the configuration of the exit tray determined by the exit tray determining unit 302. In other words, the output form determining unit 303 determines whether or not the sorting method is the job separation when the configuration of the exit tray includes only the standard exit tray, and determines which of the job separation, the offsetting and discharging, and the discharge switching the sorting method is when the configuration of the exit tray includes the standard exit tray and the optional exit tray.

The print job generating unit 304 generates a print job including control data of the printing device 2 indicating a sheet feeding opening in which a recording sheet is used or the like so that the output material is output from the printing device 2 in the output form set by the output information setting unit 300. When printing is executed, the print job generated as data processable by the printing device 2 is transmitted to the printing device 2.

(Functional Configuration of Information Processing Apparatus)

Figure 4:
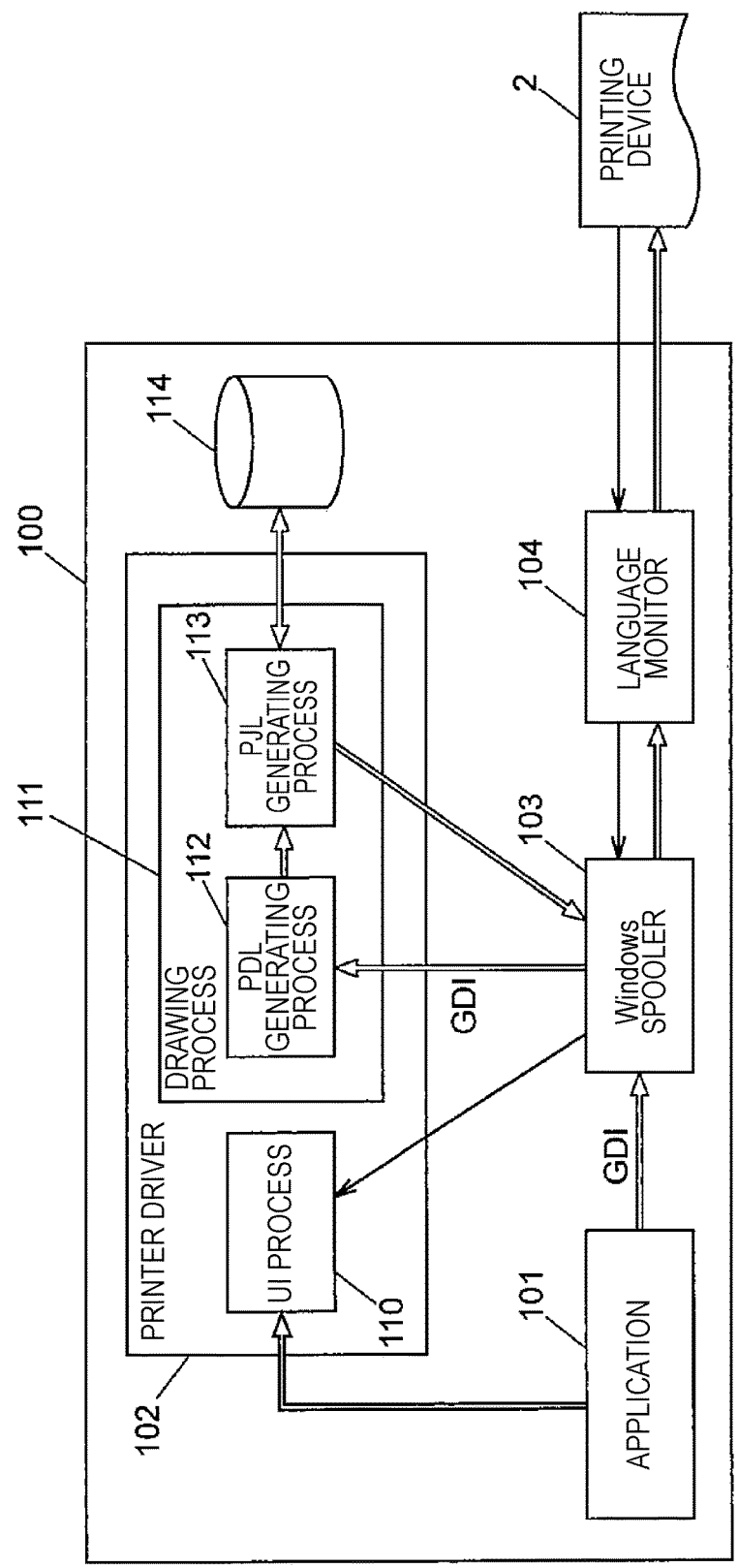
FIG. 4 is a block diagram illustrating a software configuration of a terminal device serving as an information processing apparatus.

FIG. 4 is a block diagram illustrating a functional configuration of the terminal device 3 serving as the information processing apparatus. In other words, an information processing apparatus 100 of FIG. 4 illustrates a software configuration of the terminal device 3 according to the exemplary embodiment.

As illustrated in FIG. 4, in the information processing apparatus 100, an application 101, a printer driver 102, a spooler (a Windows (a registered trademark) spooler) 103, and a language monitor 104 operate. The information processing apparatus 100 includes a storage unit 114 that is configured with a non-volatile memory such as a HDD or a flash memory and serves as an example of a storage device storing information.

The application 101 generates original data serving as a source of the print data according to an operation of the user, and the printer driver 102 serving as a program that fetches the generated original data is a program that transmits the print job to the printing device 2 via the spooler 103 and the language monitor 104 and controls an output of the recording sheet printed by the printing device 2 when the print data and the print attribute based on the original data is received from the application 101.

The printer driver 102 includes functions such as a UI process 110 and a drawing process 111. The UI process 110 functions as a user interface with the user. The drawing process 111 includes a page description language (PDL) generating process 112 and a printer job language (PJL) generating process 113, and generates a PDL and a PJL that are processable by the printing device 2 based on the transferred print data and the accompanying attribute information.

The spooler 103 is a program that temporarily stores the print job to be transmitted to the printing device 2 via a graphic device interface (GDI) according to a print instruction given from the printer driver 102, and extracts the print job and transmits the print job to the language monitor 104 according to a predetermined rule. For example, a Windows (a registered trademark) spooler may be used as the spooler 103 as illustrated in FIG. 4.

The language monitor 104 performs two-way communication with the printing device 2, monitors the state of the printing device 2, and transmits the print job processable by the printing device 2 to the printing device 2. The language monitor 104 transmits an inquiry to the printing device 2 at predetermined time intervals, and acquires the operation information (including a sheet passing direction in an immediately previous print job or the like) of the printing device 2, the configuration of the exit tray, and the like. The information acquired by the language monitor 104 is stored in the storage unit 114.

(Operation of Information Processing Apparatus)

Next, an operation of the information processing apparatus 100 according to a first exemplary embodiment will be described with reference to FIGS. 5 to 12.

Figure 5:
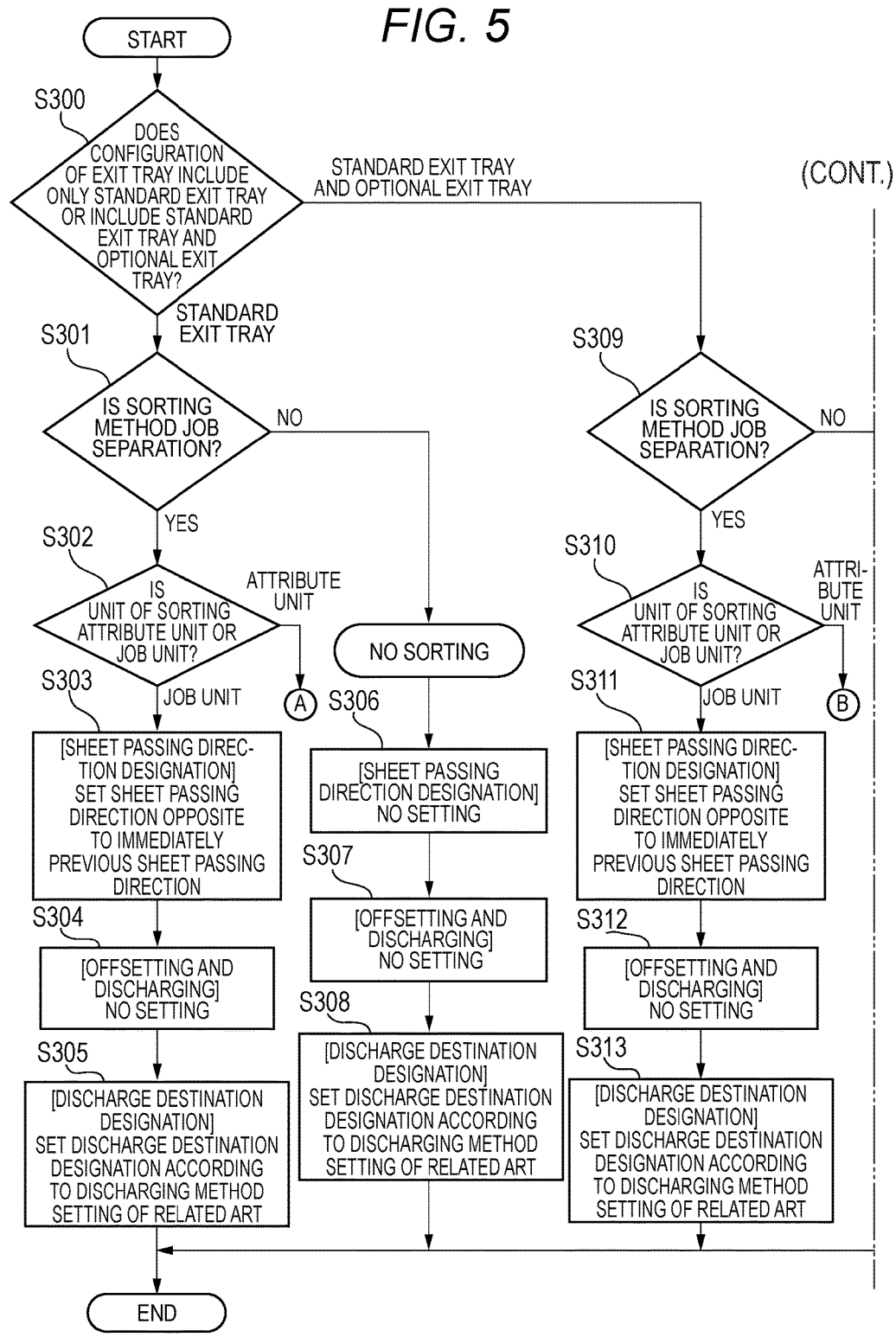
FIG. 5 is a flowchart illustrating an operation of an information processing apparatus according to a first exemplary embodiment.

FIG. 5 is a flowchart illustrating an operation of the information processing apparatus according to the first exemplary embodiment.

When the user gives a print instruction through the application 101 installed in the information processing apparatus 100, the configuration of the exit tray of the printing device 2 is first determined as a process of the information processing apparatus 100 (S300). In other words, it is determined whether the exit tray is configured with only the standard exit tray or configured with the standard exit tray and the optional exit tray based on information of the configuration of the exit tray acquired by the language monitor 104. A display by the UI process 110 of the printer driver 102 differs according to a result of determining the configuration of the exit tray.

Figure 6:
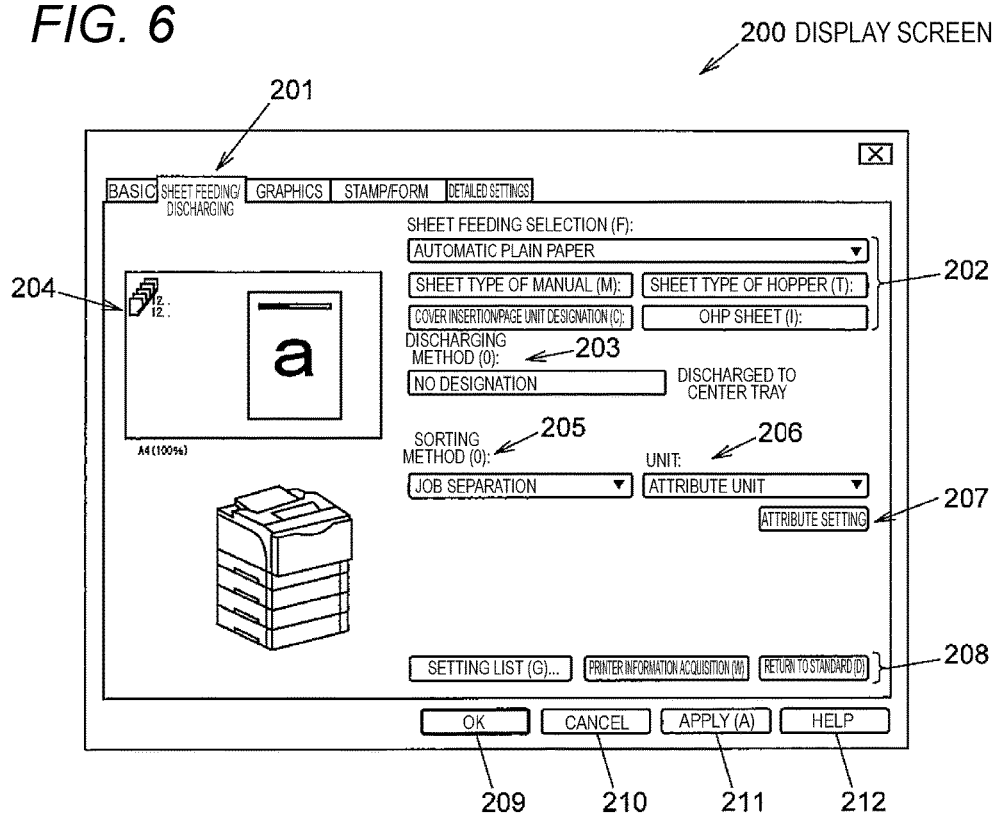
FIG. 6 is a display screen illustrating a display of a UI process of a printer driver.

FIG. 6 is a display screen illustrating a display of the UI process 110 of the printer driver 102. A display screen 200 is a screen for setting how output materials are sorted. In the display screen 200 illustrated in FIG. 6, a dialogue screen in a state in which a sheet feeding/discharging tab 201 in an upper portion is pushed is displayed. A sheet feeding selection button 202 for selecting either of automatic sheet feeding and manual sheet feeding and a sheet type in the case of manual sheet feeding is arranged on an upper right portion, and a discharging method selection button 203 for selecting a discharging method is arranged on a portion below the sheet feeding selection button 202. A display field 204 indicating a printing state is arranged on an upper left portion of the screen.

A sorting method selection button 205 for selecting the sorting method is arranged substantially in the middle of the display screen 200, and a unit selection button 206 for selecting the unit of sorting is arranged on the right side. An attribute setting button 207 that becomes valid when the attribute unit is selected as the unit of sorting is arranged below the unit selection button 206. The attribute setting button 207 is a button for setting an attribute unit to be used.

A button 208 for a setting list, printer information acquisition, and the like is arranged below the attribute setting button 207. An OK button 209 for reflecting a setting and closing the screen, a cancel button 210 for cancelling a setting, an apply button 211 for reflecting a setting and leaving a screen display without change, and a help button 212 for obtaining necessary information related to a setting are arranged on the bottom of the display screen 200.

When the configuration of the exit tray includes only the standard exit tray (standard exit tray in S300), it is determined whether or not the sorting method is the job separation (S301).

If the user pushes "θ" of the sorting method selection button 205 in the display screen 200 when the sorting method is set, a choice of sorting methods is displayed.

Figure 7:
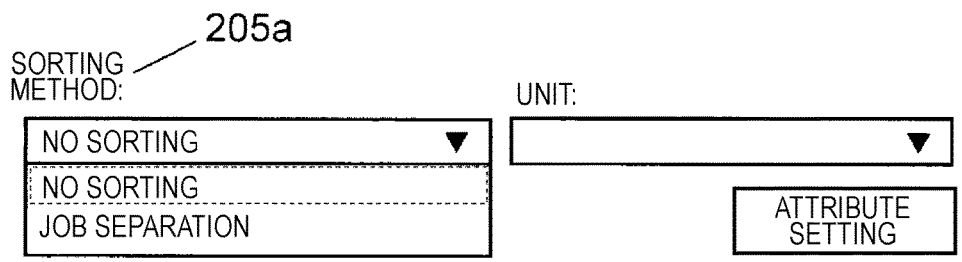
FIG. 7 is a display illustrating a choice of sorting methods when a configuration of an exit tray includes only a standard exit tray.

FIG. 7 is a display illustrating a choice of sorting methods when the configuration of the exit tray includes only the standard exit tray. As illustrated in a display 205*a* of the sorting method of FIG. 7, in this case, control is performed such that there are two choices of "no sorting" and "job separation."

Here, when the job separation is selected as the sorting method (Yes in S301), the unit of sorting is determined (S302). Here, when the user pushes "θ" of the unit selection button 206 in the display screen 200, a choice of units of sorting is displayed.

Figure 8:
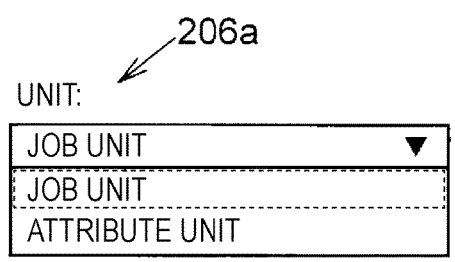
FIG. 8 is a display illustrating a choice of units of sorting when a configuration of an exit tray includes only a standard exit tray, and job separation is selected.

FIG. 8 is a display illustrating a choice of units of sorting when the configuration of the exit tray includes only the standard exit tray, and the job separation is selected as the sorting method. As illustrated in a display 206*a* of the unit of sorting of FIG. 8, in this case, either of the job unit and the attribute unit can be selected as the unit of sorting.

Figure 10:
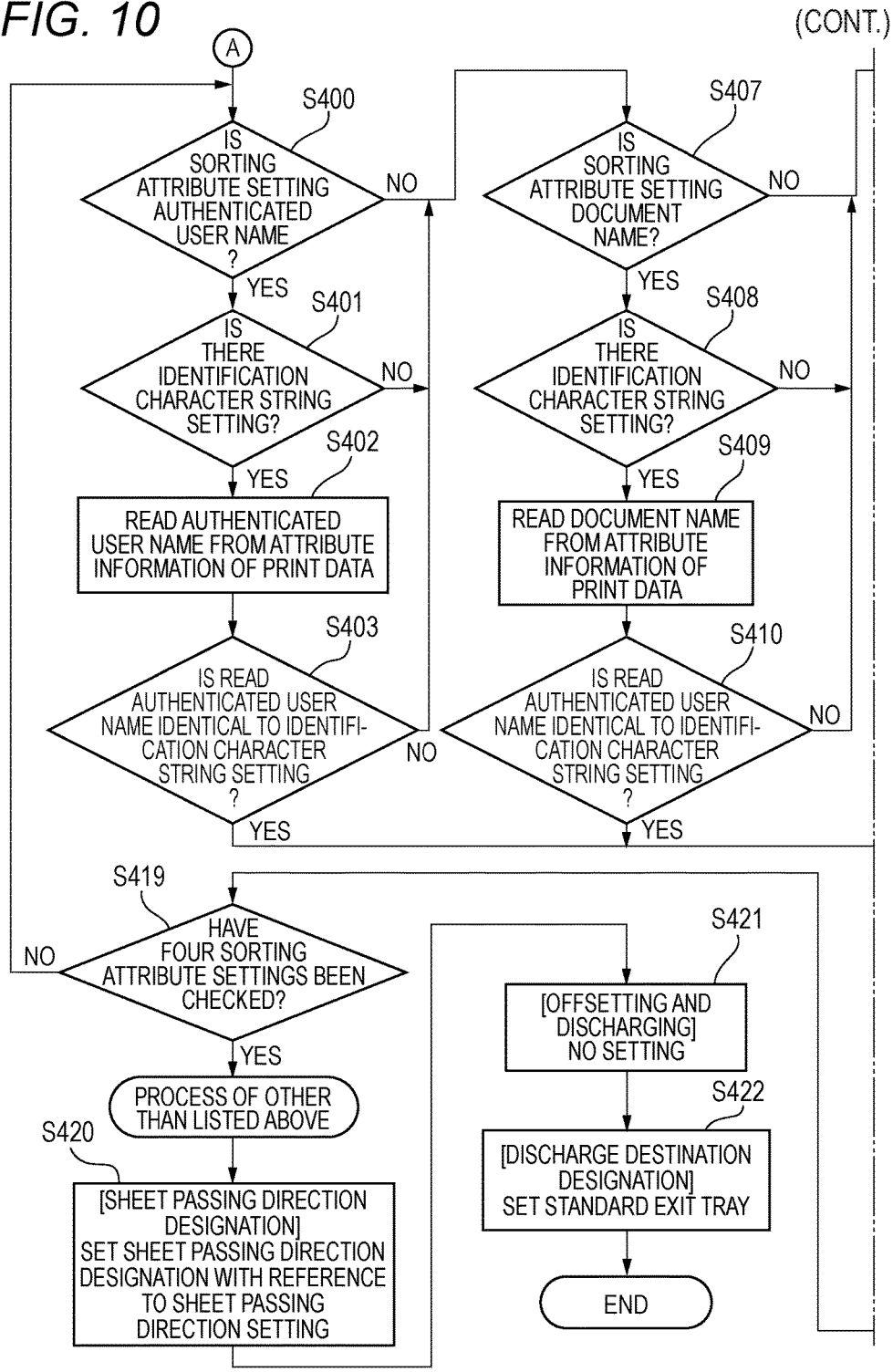
FIG. 10 is a flowchart illustrating a sorting process based on a standard exit tray, job separation, and an attribute unit.

Here, when the attribute unit is selected as the unit of sorting (attribute unit in S302), a process of a flowchart of FIG. 10 illustrating a process when the attribute unit is selected is performed.

When the job unit is selected as the unit of sorting (job unit in S302), the job separation is performed in job units, and the printer driver 102 sets a recording sheet passing direction designation command at the time of PJL generation so that the printing device 2 performs an output in a different direction from the sheet passing direction of the recording sheet set in an immediately previous print job (S303). In other words, when the sheet passing direction of the recording sheet set in the immediately previous print job is the longitudinal direction, the traverse direction is set as the current sheet passing direction, and when the sheet passing direction of the recording sheet set in the immediately previous print job is the traverse direction, the longitudinal direction is set as the current sheet passing direction.

As a process of designating a different direction from the sheet passing direction of the recording sheet set in the immediately previous print job as the sheet passing direction of the recording sheet, when the recording sheet passing direction designation command is set in the PJL, an immediately previous sheet passing direction which is acquired by the language monitor 104 and stored in the storage unit 114 of the non-volatile memory may be read, and the sheet passing direction different from the immediately previous sheet passing direction may be set.

As described above, because the offset catch tray having the offsetting and discharging function is mounted only in the optional exit tray, it is difficult for the offsetting and discharging to operate since the current discharge destination is the standard exit tray, and thus a command for designating the offsetting and discharging is not set (S304).

In this regard, the command for designating the standard exit tray is set as the discharge destination (S305), the PJL and the PDL that are generated are output to the printing device 2. As a result, the printing device 2 performs sorting by discharging the recording sheets in the different direction (which is the traverse direction at the current time when the immediately previous direction is the longitudinal direction and the longitudinal direction when the immediately previous direction is the traverse direction) from the sheet passing direction of the immediately previous print job.

Further, when the configuration of the exit tray includes only the standard exit tray but the job separation is not selected as the sorting method (No in S301), the non-sorting process of the related art is performed. In other words, when the sheet passing direction designation is not set (S306), offset ejection is not set (S307), and the discharge destination designation is set according to the discharging method setting of the related art (S308).

Further, even when the configuration of the exit tray is initially determined to include the standard exit tray and the optional exit tray (standard exit tray+optional exit tray in S300), the sorting method is similarly determined (S309). However, in this case, a choice of sorting methods illustrated in FIG. 9 is displayed unlike the case in which the user pushes "θ" of the sorting method selection button 205.

Figure 9:
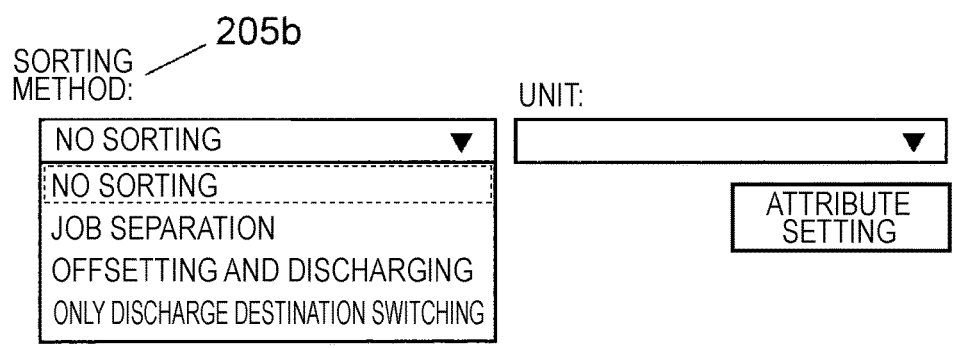
FIG. 9 is a display illustrating a choice of sorting methods when a configuration of an exit tray includes a standard exit tray and an optional exit tray.

FIG. 9 is a display illustrating a choice of sorting methods when the configuration of the exit tray includes the standard exit tray and the optional exit tray. As illustrated in a display 205b of the sorting method of FIG. 9, in this case, there are four choices of "no sorting," "job separation," "offsetting and discharging," and "only discharge destination switching."

When the sorting method is the job separation (Yes in S309), the unit of sorting is determined (S310). When the unit of sorting is the attribute unit (attribute unit in S310), a process when the attribute unit is selected is performed according to a flowchart of FIG. 12. Further, when the unit of sorting is the job unit (job unit in S310), the sheet passing direction designation is set (S311), and a subsequent operation (S311 to S313) is the same as the operation (S303 to S305) when the exit tray includes only the standard exit tray, and the sorting method is the job separation.

When the configuration of the exit tray includes the standard exit tray and the optional exit tray but the sorting method is not the job separation (No in S309), it is determined whether or not the sorting method is the offsetting and discharging (S314).

When the sorting method is the offsetting and discharging (Yes in S314), the command for designating the sheet passing direction is not set (S315), the command for designating the offsetting and discharging is set (S316), and the discharge destination designation is set according to the discharging method setting of the related art (S317).

Further, even when the sorting is performed through the offsetting and discharging, similarly to the sorting based on the job separation, either of the job unit and the attribute unit may be selected as the unit of sorting, and the offsetting and discharging may be performed in attribute units in addition to the job units.

When the sorting method is not the offsetting and discharging (No in S314), it is determined whether or not only the discharge switching is the sorting method (S318). Here, when only the discharge switching is the sorting method (Yes in S318), the command for designating the sheet passing direction is not set (S319), and the command for designating the offsetting and discharging is not set (S320). Then, a different discharge destination (that is, the current exit tray is the optional exit tray when the immediately previous exit tray is the standard exit tray, and the current exit tray is the standard exit tray when the immediately previous exit tray is the optional exit tray) from the immediately previous discharge destination is set as the discharge destination designation (S321).

Lastly, when the discharge switching is neither the sorting method (No in S318), the non-sorting process is performed. In other words, the command for designating the sheet passing direction is not set (S322), the command for designating the offsetting and discharging is not set (S323), the discharge destination designation is set according to the discharging method setting of the related art (S324), and the output operation is performed in the non-sorting manner of the related art.

Next, a process when the exit tray is the standard exit tray, the sorting method is the job separation, and the unit of sorting is the attribute unit will be described with reference to a flowchart of FIG. 10.

FIG. 10 is a flowchart illustrating a sorting process based on the standard exit tray, the job separation, and the attribute unit.

When the attribute unit is selected as the unit of sorting through the unit selection button 206 in the display screen 200 (see FIG. 6) by the UI process 110 of the printer driver 102, if the attribute setting button 207 arranged below the unit selection button 206 is pushed, an attribute setting dialogue screen is displayed, and an attribute setting can be performed.

Figure 11:
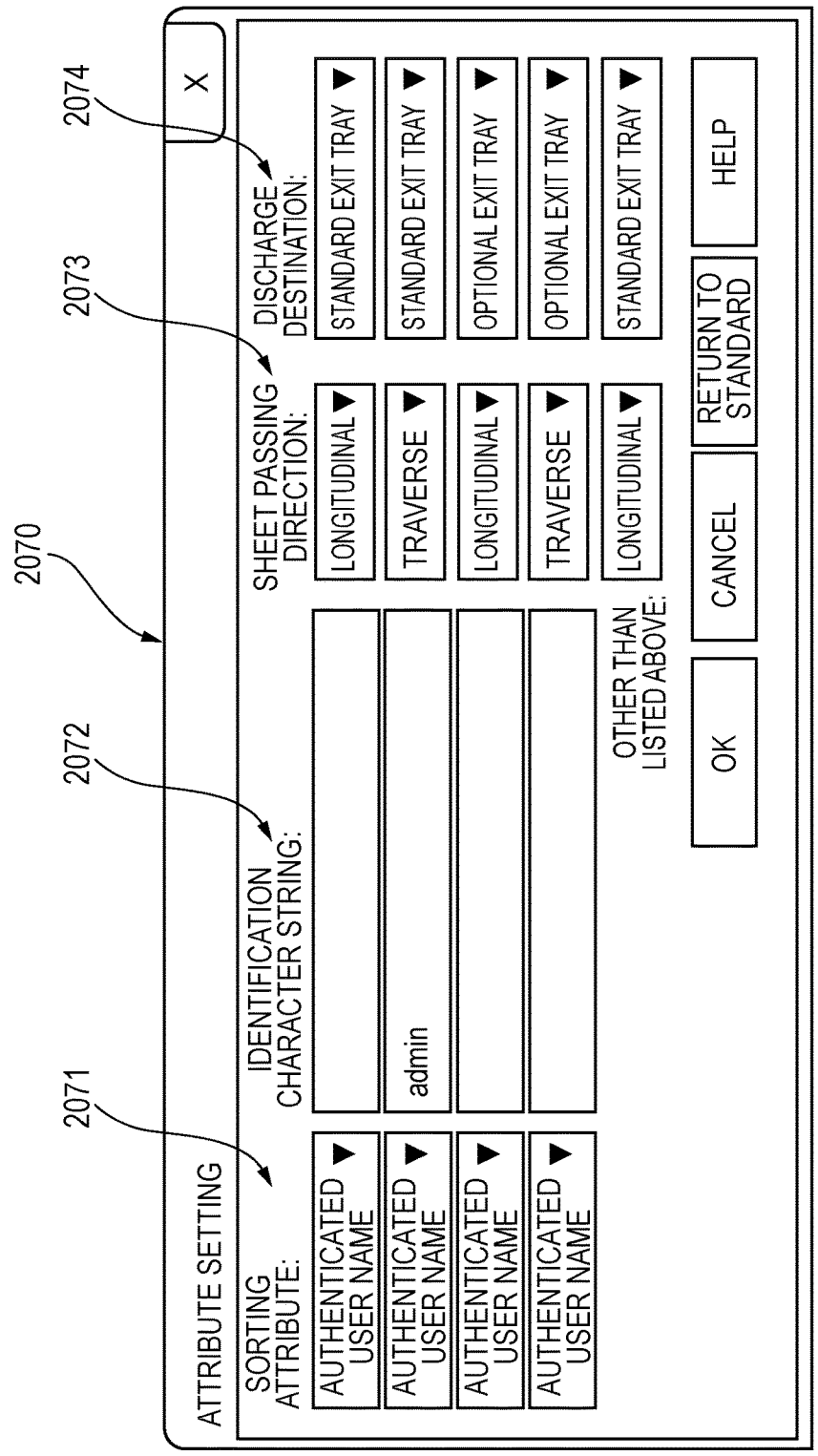
FIG. 11 is an exemplary dialogue screen of an attribute setting.

FIG. 11 illustrates an exemplary attribute setting dialogue screen. In a dialogue screen 2070 illustrated in FIG. 11, a sorting attribute 2071, an identification character string 2072, a sheet passing direction 2073, and a discharge destination 2074 are set.

Examples of the sorting attribute 2071 includes an authenticated user name, a document name, a form file name, and an output sheet name. The identification character string 2072 is a character string deciding sorting, and a wild card may be also used. As the sheet passing direction 2073, there are two directions, that is, the longitudinal direction and the traverse direction. As the discharge destination 2074, there are the standard exit tray and the optional exit tray. A setting of the exit tray is performed such that the language monitor 104 serving as the output information setting unit (setting unit) 300 sets an identifier of the exit tray.

When a character string input to the identification character string 2072 is detected in the attribute selected in the sorting attribute, the printer driver 102 generates the PDL and the PJL so that the printing device 2 performs an output according to a setting of the sheet passing direction 2073 or the discharge destination 2074.

For example, in the example illustrated in FIG. 11, in the second line of the attribute setting, the authenticated user name is set as the sorting attribute 2071, admin is set as the identification character string 2072, traverse is set as the sheet passing direction 2073, and the standard exit tray is set as the discharge destination 2074, and in "other than listed above" of the fifth line, longitudinal is set as the sheet passing direction 2073, and the standard exit tray is set as the discharge destination 2074.

Here, when the print job in which the authenticated user name of the attribute information is "admin" is executed, a printing result is discharged to the standard exit tray through traverse sheet passing. Further, when the print job in which the authenticated user name of the attribute information is not "admin" is executed, a printing result is discharged to the standard exit tray through longitudinal sheet passing.

In a process of a flowchart of FIG. 10, first, the sorting attribute setting is determined. In other words, first, it is determined whether or not the sorting attribute setting is the authenticated user name (S400). When the sorting attribute setting is the authenticated user name (Yes in S400), it is determined whether or not there is an identification character string setting (S401).

When there is an identification character string setting (Yes in S401), the authenticated user name is read from the attribute information of the print data (S402). Then, it is determined whether or not the read authenticated user name is identical to the identification character string setting (S403). When the read authenticated user name is identical to the identification character string setting (Yes in S403), the sheet passing direction designation is set with reference to the sheet passing direction setting of the recording sheet (S404). Then, the offset ejection is not set (S405), the standard exit tray is set as the discharge destination designation (S406).

Further, when the sorting attribute setting is not the authenticated user name (No in S400), when there is no identification character string setting (No in S401), or when the read authenticated user name is not identical to the identification character string setting (No in S403), it is determined whether or not the sorting attribute setting is the document name (S407).

When the sorting attribute setting is the document name (Yes in S407), it is determined whether or not there is an identification character string setting (S408). When there is an identification character string setting (Yes in S408), the document name is read from the attribute information of the print data (S409). Then, it is determined whether or not the read document name is identical to the identification character string setting (S410).

When the read document name is identical to the identification character string setting as a result (Yes in S410), the sheet passing direction designation is set with reference to the sheet passing direction setting (S404), the offset ejection is not set (S405), and the standard exit tray is set as the discharge destination (S406).

Further, when the sorting attribute setting is not the document name (No in S407), when there is no identification character string setting (No in S408), or when the read document is not identical to the identification character string setting (No in S410), the process proceeds to determination of a next sorting attribute setting.

In other words, it is determined whether or not the sorting attribute setting is the form file name (S411). When the sorting attribute setting is the form file name as a result (Yes in S411), it is determined whether or not there is an identification character string setting (S412). When there is an identification character string setting (Yes in S412), the form file name is read from the attribute information of the print data (S413), and it is determined whether or not the read form file name is identical to the identification character string setting (S414).

When the read form file name is identical to the identification character string as a result (Yes in S414), the sheet passing direction designation and a setting of the offset ejection and the discharge destination designation are performed but are the same as the process of S404 to S406.

Further, when the sorting attribute setting is not the form file name (No in S411), when there is no identification character string setting (No in S412), or when the read form file name is not identical to the identification character string setting (No in S414), it is then determined whether or not the sorting attribute setting is the output sheet name (S415). When the sorting attribute setting is the output sheet name (Yes in S415), it is determined whether or not there is an identification character string setting (S416), and when there is an identification character string setting (Yes in S416), the output sheet name is read from the attribute information of the print data (S417), and it is determined whether or not the read output sheet name is identical to the identification character string setting (S418).

Then, when the read output sheet name is identical to the identification character string (Yes in S418), the same process as the process of S404 to S406 is performed for the sheet passing direction designation and a setting of the offset ejection and the discharge destination designation.

After the process of S404 to S406, it is determined whether or not the four sorting attribute settings have been checked (S419). Further, when the sorting attribute setting is not the output sheet name (No in S415), when there is no identification character string setting (No in S416), or when the read output sheet name is not identical to the identification character string (No in S418), it is determined whether or not the four sorting attribute settings have been checked (S419). When any one of the four sorting attribute settings has not been checked (No in S419), the determination of the sorting attribute setting is performed again (S400).

When the four sorting attribute settings have been checked (Yes in S419), the process proceeds to a process of "other than listed above." In other words, the sheet passing direction designation is set with reference to the sheet passing direction setting (S420), the offset ejection is not set (S421), and the standard exit tray is set as the discharge destination designation (S422).

Next, a process when the exit tray includes the standard exit tray and the optional exit tray, the sorting method is the job separation, and the unit of sorting is the attribute unit will be described with reference to a flowchart of FIG. 12.

FIG. 12 is a flowchart illustrating a sorting process based on the standard exit tray and the optional exit tray, the job separation, and the attribute unit.

In this case, as illustrated in FIG. 12, the process is also substantially the same as the process of FIG. 10 when the exit tray includes the standard exit tray. A different point lies in that in the current process of FIG. 12, since there are two exit trays of the standard exit tray and the optional exit tray, when the discharge destination designation is set at the end of the process, either of the standard exit tray and the optional exit tray can be set.

In other words, instead of the process of S406 and S422 in which the standard exit tray is set as the discharge destination designation in FIG. 10, in FIG. 12, it is determined whether or not the discharge destination setting is the standard exit tray (S506 or S524), the standard exit tray is set as the discharge destination designation (S507 or S525) when the standard exit tray is selected, and the optional exit tray is set as the discharge destination designation when the standard exit tray is not selected (S508 or S526).

(Effects of First Exemplary Embodiment)

In the related art, the job separation can be performed only in job units, but according to the first exemplary embodiment, the job separation can be performed in various attribute units such as in units of users. Further, since the job separation function can be implemented by the printer driver alone, even in the printing device that is not equipped with the job separation function, the sorting based on the job separation can be performed by implementing the present invention in the printer driver of the printing device. Particularly, according to the exemplary embodiment, a plurality of sorting functions can be selected, and the job separation can be simultaneously performed in a plurality of discharge destinations.

Next, an operation of the information processing apparatus 100 according to the second exemplary embodiment will be described with reference to FIGS. 13 and 14. In the first exemplary embodiment, the sorting method of the job separation is switched according to the attribute setting, but in the second exemplary embodiment, when the attribute information is simply switched, the sorting method is switched so that the sorting is performed by the set sorting method. In an example to be described below, the sorting based on the job separation is assumed to be set as the sorting method.

(Second Exemplary Embodiment)

Figure 13:
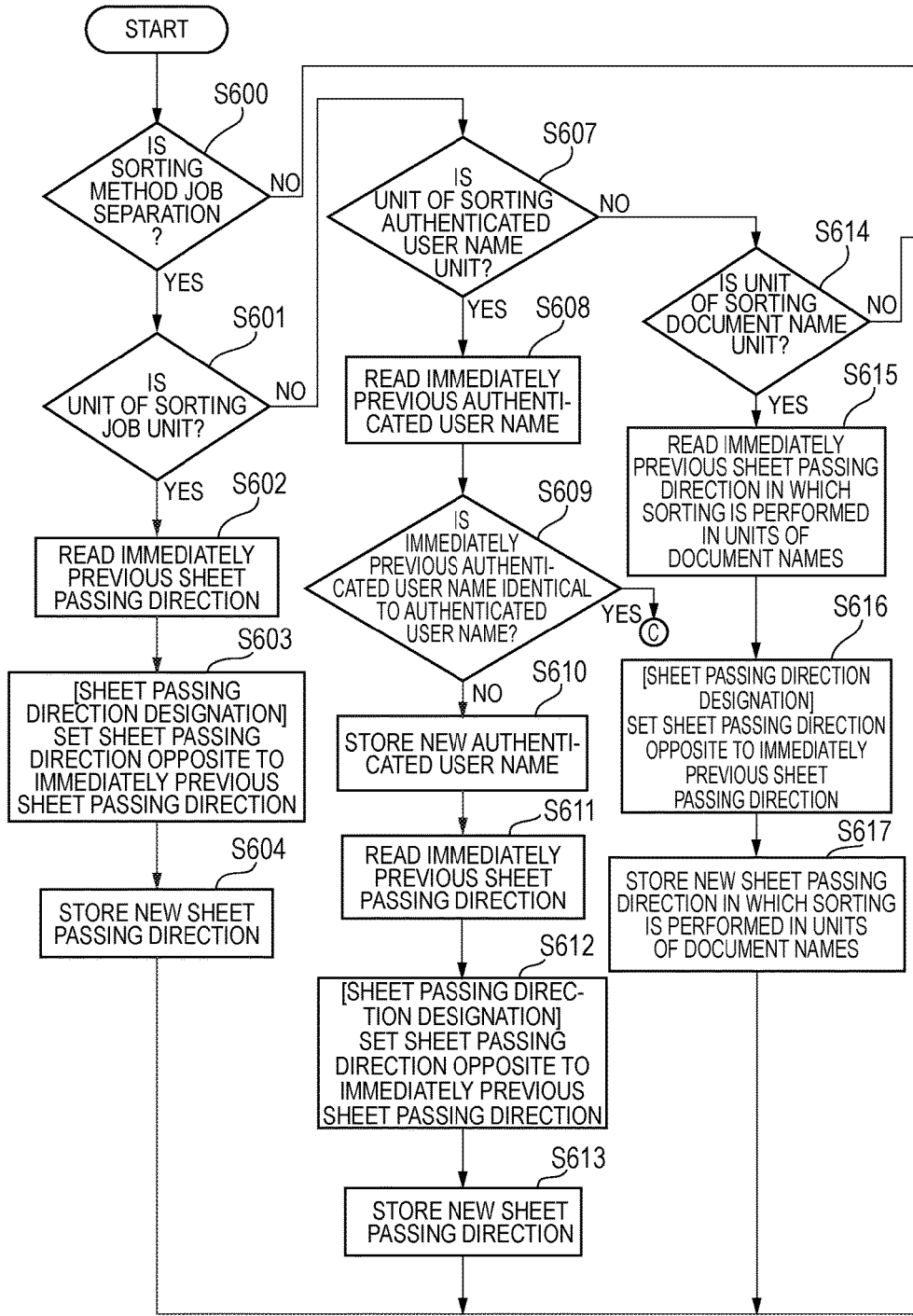
FIG. 13 is a flowchart illustrating an operation of an information processing apparatus according to a second exemplary embodiment.

FIG. 13 is a flowchart illustrating an operation of the information processing apparatus according to the second exemplary embodiment.

First, it is determined whether or not the sorting method is the job separation (S600). When the sorting method is not the job separation (No in S600), the sorting is not performed. In other words, the non-sorting process is performed. When the sorting method is the job separation (Yes in S600), an attribute which the unit of sorting is based on is determined, and each process is performed for each unit of sorting based on each attribute.

The switching of the attribute information is determined by comparing the attribute information of the immediately previous print job stored in the storage unit 114 with the attribute information of the current printing. The attribute information of the printing is set when the user designates the printing. In other words, in the display screen 200 of FIG. 6, the setting is performed by selecting the attribute unit as the unit of sorting through the unit selection button 206 that selects the unit of sorting and enabling the attribute setting button 207. Examples of the attribute include the authenticated user name, the document name, the form file name, and the output sheet name as described above.

Figure 14:
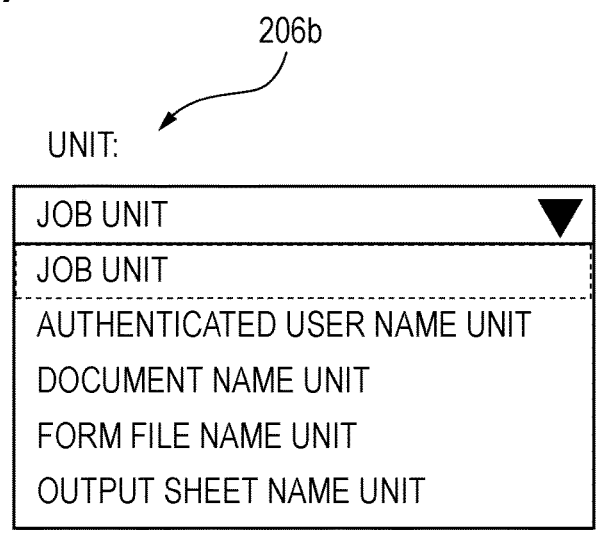
FIG. 14 is a display illustrating a choice of units of sorting when an attribute unit is set.

When the attribute unit is set as the unit of sorting, when the unit selection button 206 is pushed in the display screen 200 of FIG. 6, a choice including the attribute units as well is displayed as illustrated in FIG. 14.

FIG. 14 is a display illustrating a choice of units of sorting when the attribute unit is set. As illustrated in FIG. 14, a choice display 206b of units of sorting includes the authenticated user name, the document name, the form file name, and the output sheet name in addition to the job unit as the unit of sorting.

When the sorting method is the job separation (Yes in S600), first, it is determined whether or not the unit of sorting is the job unit (S601). Then, when the unit of sorting is the job unit (Yes in S601), the sheet passing direction in the immediately previous print job is read from the storage unit 114 (S602), the sheet passing direction (the current direction is the longitudinal direction when the immediately previous direction is the traverse direction, and the current direction is the traverse direction when the immediately previous direction is the longitudinal direction) different from the immediately previous sheet passing direction is set as the sheet passing direction designation (S603), and the new sheet passing direction is stored in the storage unit 114 (S604).

Then, the offset ejection is not set (S605), and the discharge destination designation is set according to the discharging method setting of the related art (S606). As described above, when the unit of sorting is the job unit, the process is substantially the same as the process of S301 to S305 when the exit tray is the standard exit tray in the first exemplary embodiment.

Further, when the sorting method is not the job separation (No in S600), the non-sorting process is performed. In other words, the sheet passing direction designation is not set (S626), the offset ejection is not set (S605), and the discharge destination designation is set according to the discharging method setting of the related art (S606).

Then, when the sorting method is the job separation, but the unit of sorting is not the job unit (No in S601), it is determined whether or not the unit of sorting is the authenticated user name (S607).

When the unit of sorting is the authenticated user name (Yes in S607), the immediately previous authenticated user name is read from the storage unit 114 (S608). Then, it is determined whether or not the current authenticated user name is identical to the immediately previous authenticated user name (S609).

When the current authenticated user name is not identical to the immediately previous authenticated user name (No in S609), since the authenticated user name serving as the unit of sorting has been changed, the new authenticated user name is stored in the storage unit 114 (S610). Then, the immediately previous sheet passing direction is read from the storage unit 114 (S611), and the sheet passing direction different from the immediately previous sheet passing direction is set (S612). Further, the new sheet passing direction is stored in the storage unit 114 (S613).

Thereafter, the offset ejection is not set (S605), and the discharge destination designation is set according to the discharging method setting of the related art (S606).

Further, when the current authenticated user name is identical to the immediately previous authenticated user name (Yes in S609), since the authenticated user name serving as the unit of sorting is not changed, the sorting is not performed. In other words, the non-sorting process of S626, S605, and S606 is performed.

Then, when the unit of sorting is not the authenticated user name (No in S607), it is determined whether or not the unit of sorting is the document name (S614). When the unit of sorting is determined to be the document name (Yes in S614), the immediately previous sheet passing direction in which the sorting is performed in units of document names is read from the storage unit 114 (S615), and the sheet passing direction different from the immediately previous sheet passing direction is set (S616).

Then, the new sheet passing direction in which the sorting is performed in units of document names is stored in the storage unit 114 (S617). Thereafter, the offset ejection is not set (S605), and the discharge destination designation is set according to the discharging method setting of the related art (S606).

Then, when the unit of sorting is not the document name (No in S614), it is determined whether or not the unit of sorting is the form file name (S618). When the unit of sorting is the form file name (Yes in S618), the immediately previous sheet passing direction in which the sorting is performed in units of form file names is read from the storage unit 114 (S619), and the sheet passing direction different from the immediately previous sheet passing direction is set (S620).

Then, the new sheet passing direction in which the sorting is performed in units of form file names is stored in the storage unit 114 (S621). Thereafter, the offset ejection is not set (S605), and the discharge destination designation is set according to the discharging method setting of the related art (S606).

Then, when the unit of sorting is not the form file name unit (No in S618), it is determined whether or not the unit of sorting is the output sheet name unit (S622). When the unit of sorting is the output sheet name unit (Yes in S622), the immediately previous sheet passing direction in which the sorting is performed in units of output sheet names is read from the storage unit 114 (S623), and the sheet passing direction different from the immediately previous sheet passing direction is set (S624).

Then, the new sheet passing direction in which the sorting is performed in units of output sheet names is stored in the storage unit 114 (S625). Thereafter, the offset ejection is not set (S605), and the discharge destination designation is set according to the discharging method setting of the related art (S606).

Then, when the unit of sorting is not the output sheet name unit (No in S622), no sorting is performed. In other words, the non-sorting process of S626, S605, and S606 is performed.

(Effects of Second Exemplary Embodiment)

In the related art, the job separation can be performed only in job units, but according to the second exemplary embodiment, the job separation can be performed in various attribute units such as in units of users. Further, since the job separation function can be implemented by the printer driver alone, even in the printing device that is not equipped with the job separation function, the sorting based on the job separation can be performed by implementing the present invention in the printer driver of the printing device.

The present invention is not limited to the exemplary embodiments, and various modifications can be made within the scope not departing from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
a processor configured to
perform a setting such that sorting is performed according to an output direction set for each print attribute corresponding to each print job, when the sorting is performed according to a first method of sorting output materials according to the output direction among a plurality of types of sorting methods in a printing device, and
generate content of a print instruction so that the output materials corresponding to each print job are output from the printing device according to the set sorting method,
wherein, when the sorting is performed according to the first method, the processor receives selection that the setting is performed such that the output direction is alternately changed for each print instruction.

2. The information processing apparatus according to claim 1,
wherein, when the print attribute is selected as the unit of sorting, and the printing device includes a plurality of exit trays, the processor performs the setting such that the sorting is performed according to the output direction and an identifier of the exit tray which are set for each print attribute.

3. The information processing apparatus according to claim 1,
wherein the print attribute includes at least one of an authenticated user name, a document name, a form file name, and a recording sheet name.

4. A printing system, comprising:
the information processing apparatus according to claim 1; and
a printing device that is connected with the information processing apparatus via a network and sorts print and output materials based on an instruction given from the information processing apparatus.

5. A print control method comprising:
performing a setting such that sorting is performed according to an output direction set for each print attribute corresponding to each print job, when the sorting is performed according to a first method of sorting output materials according to the output direction among a plurality of types of sorting methods in a printing device; and
generating content of a print instruction so that the output materials corresponding to each print job are output from the printing device according to the set sorting method,
wherein, when the sorting is performed according to the first method, selection is received that the setting is performed such that the output direction is alternately changed for each print instruction.

6. A non-transitory computer readable medium storing a program causing a computer to:
perform a setting such that sorting is performed according to an output direction set for each print attribute corresponding to each print job, when the sorting is performed according to a first method of sorting output materials according to the output direction among a plurality of types of sorting methods in a printing device, and
generate content of a print instruction so that the output materials corresponding to each print job are output from the printing device according to the set sorting method,
wherein, when the sorting is performed according to the first method, selection is received that the setting is performed such that the output direction is alternately changed for each print instruction.

* * * * *